Oct. 23, 1928.
E. H. McCLOUD
1,689,147
AUTOMOBILE BUMPER
Filed Dec. 27, 1927
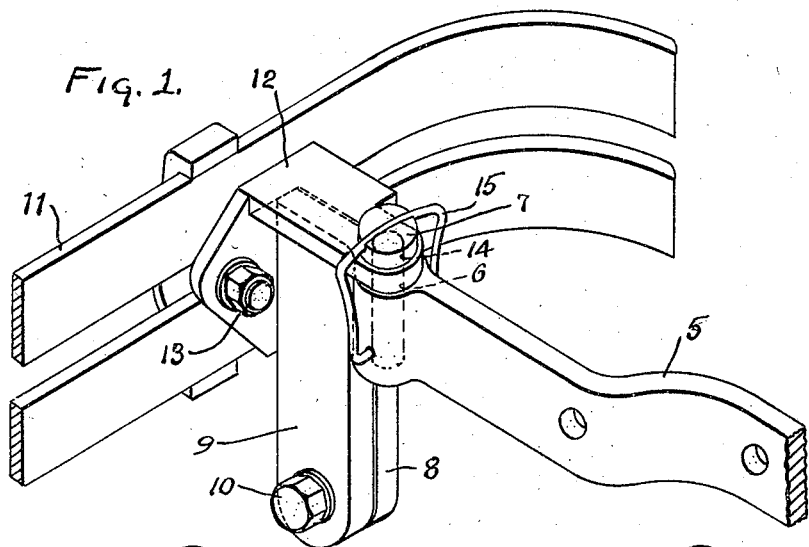
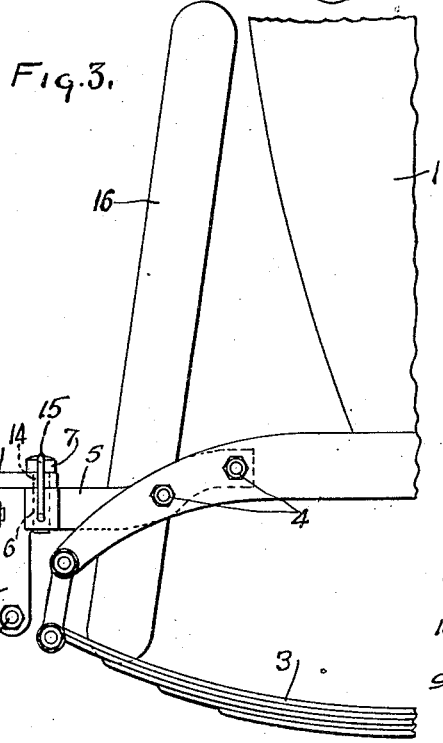
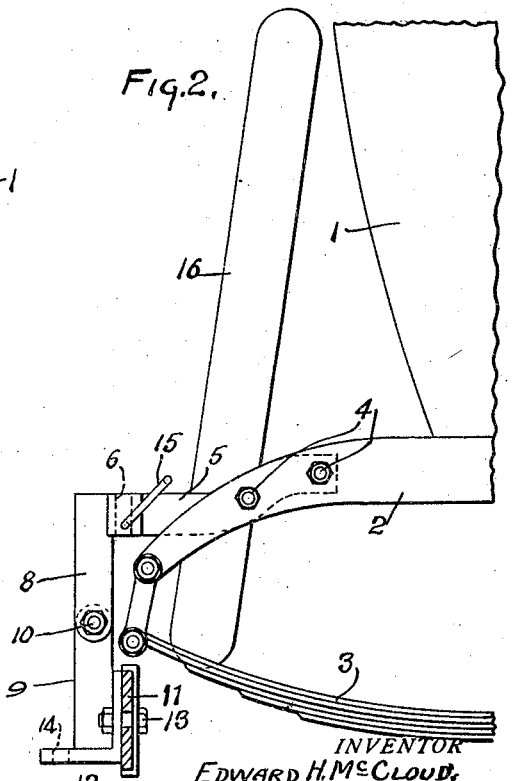
INVENTOR
EDWARD H. McCLOUD,
BY
ATTORNEYS Patented Oct. 23, 1928.

1,689,147

UNITED STATES PATENT OFFICE.

EDWARD H. McCLOUD, OF COLUMBUS, OHIO, ASSIGNOR TO THE CENTRAL BRASS & FIXTURE COMPANY, OF SPRINGFIELD, OHIO, A CORPORATION OF OHIO.

AUTOMOBILE BUMPER.

Application filed December 27, 1927. Serial No. 242,842.

This invention relates to automobile bumpers and has for its object the provision of a bumper which is pivotally connected to an automobile frame. The invention further comprises means to permit the bumper to be swung radially downward to give access to the spare tire, commonly carried at the rear of the automobile.

A further object is to provide the bumper with means for locking it in a raised or normal position, which means may be readily locked and unlocked to permit the bumper to move about its pivot.

Referring to the drawings:

Figure 1 is a view showing the bumper in normal position with the means of securing the bumper to the carrying means.

Figure 2 is a view showing the bumper in its lowered position, with the locking means unfastened.

Figure 3 is a view similar to Figure 2 showing the bumper in normal position attached to the automobile chassis and secured in locking position.

Referring more specifically to the drawings, 1 represents the body of the automobile provided with the usual chassis 2, and the springs 3. Bolted to the chassis by means of the bolts 4 are the brackets 5. These brackets are mounted one at each side of the machine and have apertures 6 extending through them and adapted to receive the pins 7, which serve as locking pins.

Secured to the brackets are the downwardly depending standards 8, which have links 9 pivoted to them by means of the bolts 10. These links are fashioned with rectangular portions 12 for the attachment of the bumper 11 to the links as by nuts and bolts 13. The rectangular portions 12 are provided with openings 14 and are adapted to fit upon the upper surface of the brackets 5, the openings being adapted to receive the locking pins 7, thereby serving to retain the bumper in normal position.

There is also provided a spring member 15 which is loosely mounted in the bracket 5, as shown in Figure 1, and which is adapted to retain the pin 7 in position through its spring action and frictional engagement with the pin.

It will be obvious from the construction set forth and illustrated herein that when the pin 7 is removed the bumper 11 and the links 9 are free to turn about the pivots 10, thereby rendering access easy to the tire 16 carried in any appropriate manner at the rear of the body 1.

It will now be understood that this invention comprehends the combination with an automobile, of a protecting bumper adjustably mounted on the chassis in such wise that it will occupy two positions, according to adjustment; one position being the normal one, in which the bumper protects the rear of the vehicle but which incidentally obstructs ready access to the spare tire or tires which are to be mounted on the chassis and at times removed from the rear carrier; and the other position one in which the bumper is removed from obstructing the ready manipulation of the tire or tires. Thus in the case of this invention the bumper is capable of two positions,—the normal to protect the vehicle, and the abnormal to remove it from interfering with the mounting and removal of the extra tire or tires; and yet the bumper is always attached to the vehicle by its mountings.

I believe myself to be the first to so mount an automobile bumper and therefore wish to be understood as broadly claiming what is here stated.

It will be understood that the above construction is illustrative only of the invention, considerable variations therefrom being permissible while remaining within the scope of the inventive concept, and I desire to comprehend within my invention such modifications as may be clearly embraced within my claims and the scope of my invention.

Having thus fully described my invention, what I claim is new and desire to secure by Letters Patent, is:

1. The combination with an automobile bumper proper, of attaching means by which such bumper may be mounted on the machine, the attaching means including a pin adapted to permit the bumper to be adjusted alternately in a normal position and an abnormal position and spring means for holding the pin in position.

2. The combination with an automobile chassis, of a bumper adapted to occupy alternately a normal and an abnormal position, and attaching means by which the bumper is so secured to the vehicle in either of said positions including a pin and spring holding means for said pin, the said attaching means comprising a bracket, and a bumper pivoted to the bracket.

3. The combination with an automobile chassis, of a bumper adapted to occupy alternately a normal and an abnormal position, and attaching means by which the bumper is secured to the vehicle in either of said positions, the said attaching means comprising a bracket, a bumper pivoted to the bracket, releasable means on said bracket for locking the bumper in normal position, and means for retaining the locking means in position, including a spring pressed pin.

4. The combination with an automobile chassis, of a bumper adapted to occupy alternately a normal and an abnormal position, attaching means by which the bumper is so secured to the vehicle in either of said positions, the said means comprising a bracket terminating in a standard, a shaft through the standard, a link pivoted on the shaft, the said link being provided with means for securing the bumper thereto, a member adapted to cover the said standard, and means projecting through the said member and bracket to releasably secure the bumper and link in normal position.

5. The combination with an automobile chassis, of a bracket secured to the chassis, the bracket terminating in a standard, a link hinged to the said standard, a bumper carried by the link and means for locking the said bumper in normal position, the said means comprising a pin projected into the link and bracket.

6. The combination with an automobile chassis, of a bracket secured to the chassis, a standard integral with the bracket, the said bracket being provided with a perforation adjacent the standard, a link hinged to the standard and adapted to be swung in a vertical plane, a bumper mounted on the link, the said link being provided with an aperture adapted to normally register with the aperture in the bracket, a locking pin extending into the apertures, and means for securing the locking pin in position, said means comprising a member in removable engagement with the said pin and securing the pin in position by spring tension.

In testimony whereof, I affix my signature.

EDWARD H. McCLOUD.